US012305959B1

(12) United States Patent
Ding et al.

(10) Patent No.: US 12,305,959 B1
(45) Date of Patent: May 20, 2025

(54) MODIFIABLE TURRET FOR OPTICAL SCOPE

(71) Applicant: Leapers, Inc., Livonia, MI (US)

(72) Inventors: Tai-lai Ding, Northville, MI (US); Yu-Hsiang Su, Zhubei (TW)

(73) Assignee: Leapers, Inc., Livonia, MI (US)

( * ) Notice: Subject to any disclaimer, the term of this patent is extended or adjusted under 35 U.S.C. 154(b) by 0 days.

(21) Appl. No.: 19/018,289

(22) Filed: Jan. 13, 2025

(51) Int. Cl.
*F41G 1/38* (2006.01)
*G02B 23/16* (2006.01)

(52) U.S. Cl.
CPC ............... *F41G 1/38* (2013.01); *G02B 23/16* (2013.01)

(58) Field of Classification Search
CPC ..... F41G 1/16; F41G 1/18; F41G 1/38; G02B 23/16
USPC .......................................................... 42/124
See application file for complete search history.

(56) References Cited

U.S. PATENT DOCUMENTS

| | | | |
|---|---|---|---|
| 8,001,714 B2 | 8/2011 | Davidson | |
| 8,166,697 B1 * | 5/2012 | Sueskind | F41G 1/38 42/122 |
| 8,312,667 B2 | 11/2012 | Thomas et al. | |
| 8,365,455 B2 | 2/2013 | Davidson | |
| 8,806,798 B2 | 8/2014 | Crispin | |
| 8,984,796 B2 | 3/2015 | Thomas et al. | |
| 9,046,913 B2 | 6/2015 | Crispin | |
| 9,915,503 B2 | 3/2018 | Davidson | |
| 9,970,735 B2 | 5/2018 | Walker | |
| 11,313,649 B1 * | 4/2022 | Johnson | G01C 3/00 |
| 2003/0140545 A1 * | 7/2003 | Huber | F41G 1/38 42/122 |
| 2003/0145505 A1 * | 8/2003 | Kenton | F41G 1/38 42/135 |
| 2007/0240356 A1 * | 10/2007 | Klepp | G02B 23/00 42/122 |
| 2008/0066364 A1 * | 3/2008 | Klepp | F41G 1/38 42/122 |
| 2009/0064561 A1 * | 3/2009 | Piltonen | F41G 1/38 42/119 |
| 2012/0154907 A1 * | 6/2012 | Schmitt | F41G 1/38 359/399 |

(Continued)

OTHER PUBLICATIONS

NRA Staff, Nikon's Monarch Riflescope, American Rifleman, https://www.americanrifleman.org/content/nikon-s-monarch-riflescopes/, dated Sep. 1, 2009.

(Continued)

*Primary Examiner* — Troy Chambers
*Assistant Examiner* — Benjamin S Gomberg
(74) *Attorney, Agent, or Firm* — Warner Norcross + Judd LLP (57) ABSTRACT

A turret kit for an optical scope including a base, a cap, dials and a cover for at least one of the dials is provided whereby a user can rapidly, efficiently and consistently switch from one turret to another. The kit can include a base including a lower perimeter defining a base diameter, a first dial including a first dial outer diameter that is less than the base diameter, and a second dial including a second dial outer diameter that is greater than the first dial outer diameter and greater than the base diameter. The first and second dials are interchangeably mountable to the base and can provide different dimensions, functionality and/or reference indicia in different formats.

20 Claims, 9 Drawing Sheets

(56) References Cited

U.S. PATENT DOCUMENTS

| | | | |
|---|---|---|---|
| 2012/0195023 A1* | 8/2012 | Tang | G02B 23/105 |
| | | | 359/425 |
| 2013/0232846 A1* | 9/2013 | Wagner | F41G 1/38 |
| | | | 42/119 |
| 2014/0196351 A1* | 7/2014 | Campean | F41G 1/38 |
| | | | 74/504 |
| 2015/0070758 A1* | 3/2015 | Ingenito | G02B 23/16 |
| | | | 359/399 |
| 2015/0268001 A1* | 9/2015 | Porter | F41G 1/38 |
| | | | 42/130 |
| 2016/0231554 A1* | 8/2016 | Tang | G02B 23/14 |
| 2018/0023922 A1* | 1/2018 | Walker | G02B 23/14 |
| | | | 42/122 |
| 2019/0128642 A1* | 5/2019 | Davis | F41G 1/38 |
| 2019/0310052 A1* | 10/2019 | Krausz | F41G 1/38 |
| 2020/0326155 A1* | 10/2020 | Hamilton | G02B 27/32 |
| 2021/0302127 A1* | 9/2021 | Mueller | F41G 1/38 |
| 2021/0389553 A1* | 12/2021 | Campbell | G02B 7/16 |
| 2022/0042768 A1* | 2/2022 | Hamilton | G02B 23/16 |
| 2023/0099212 A1* | 3/2023 | Toy | F41G 1/38 |
| | | | 42/119 |

OTHER PUBLICATIONS

Nikon Monarch 4-16X 42 mm SF, Technical | Dope Bag | Optics Special, American Rifleman, dated Oct. 2007.
Nikon Monarch 7 Riflescope Instruction Manual, dated at least as early as Jan. 7, 2025.

* cited by examiner

MODIFIABLE TURRET FOR OPTICAL SCOPE

BACKGROUND OF THE INVENTION

The present invention relates to the optical sighting devices, and more particularly to an adjustment control system for an optical scope mountable to a weapon.

There are a variety of commercially available optical aiming devices used to align an associated weapon with a target during an aiming or shooting operation. One such device is an optical scope, which can be mounted to a weapon, such as a firearm, for example, a rifle. Most scopes include one or more adjustment controls in the form of one or more turrets that provide for windage and/or elevation correction for a reticle or aiming element visible through the scope. The amount of available adjustment of such turrets to accommodate different shooting ranges, wind drift and other environmental conditions can vary from scope to scope and from one manufacturer to the next.

Many riflescopes are provided with common, low-profile turrets. These turrets include a cap that covers an adjustment dial. When sighting in a rifle to which the scope is secured, a user removes the cap and adjusts the dial to move the reticle and thereby compensate for windage or elevation. After sight in, the cap is reinstalled, and not removed again unless something happens to the scope or weapon requiring another sight in. The issue with such simple cap-and-forget type turrets is that they do not provide easy or fine tuning of the scope or point of aim when a user desires quick adjustment for different ranges or shooting conditions. Accordingly, users will purchase a completely separate replacement set of turret dials for this purpose. Many times, however, installation of these replacement dials requires different fasteners and tools to secure the dial to the turret. Moreover, aftermarket dials might not perfectly fit certain scopes, so some further work or shimming is necessary to fit those dials properly. In some cases, the replacement dial is merely a duplicate of the factory dial, only simply taller. Thus, the user cannot easily cover and protect the replacement turret like they could with the factory turret to prevent the turret from being bumped or inadvertently adjusted, thereby offsetting the point of impact from the sight in conditions.

Accordingly, there remains room for improvement in the field of scope adjustment controls and in particular, different replaceable turrets that can be switched easily from one to another by a user.

SUMMARY OF THE INVENTION

A turret kit for an optical scope including a base, a cap, dials of different dimensions and functionality, and an optional cover for at least one of the dials is provided whereby a user can rapidly, efficiently and consistently switch from one turret to another.

In one embodiment, the kit can include a base including a lower perimeter defining a base diameter, a first dial including a first dial outer diameter that is less than the base diameter, and a second dial including a second outer dial diameter that is greater than the first dial outer diameter and greater than the base diameter. The first and second dials are interchangeably mountable to the base and can provide different dimensions, functionality and/or reference indicia in different formats.

In another embodiment, the kit can include a cap configured to secure the first dial to the base when the first dial is installed relative to the base and to secure the second dial to the base when the second dial is installed relative to the base. The cap can be reusable with each dial to secure either to the base, optionally without complicated fasteners or other securement mechanisms. In some cases, the cap can be installable without the use of complicated tools.

In still another embodiment, the kit can include a dust cover placeable over the first dial when the first base is installed relative to the base but not the second dial when the second dial is installed relative to the base. Due to the different dimensions of the dials, the dust cover might fit over the first dial, which can be smaller than the second dial, over which the dust cover cannot be installed in some applications.

In yet another embodiment, the base can be configured to seemingly engage a scope tube. The base can include outer shaft threads and base threads. The base threads can be closer to the scope tube than the outer shaft threads.

In even another embodiment, the dust cover can include dust cover threads configured to engage the base threads and secure the dust cover over the first dial to thereby conceal the first dial.

In a further embodiment, the base can include a base shelf above the base threads. The first dial can include a first dial lower edge. The first dial lower edge can be disposed above the base threads when the first dial is installed relative to the base.

In still a further embodiment, the second dial can include a second dial lower edge. The second dial lower edge can be disposed below and/or adjacent the base dial threads when the second dial is installed relative to the base.

In yet a further embodiment, the dust cover threads can engage the base threads below the first dial lower edge when the first dial is installed relative to the base.

In even a further embodiment, the base can include a base outer shaft. The first dial can include a first dial flange that bounds a first shaft hole configured to receive the base outer shaft when the first dial is installed relative to the base. The second dial can include a second dial flange that bounds a second shaft hole configured to receive the base outer shaft when the second dial is installed relative to the base.

In another embodiment, the kit can include an elastomeric seal disposed between the cap and the first dial flange when the first dial is installed relative to the base, or disposed between the cap and the second dial flange when the second dial is installed relative to the base.

The current embodiments provide an optical weapon scope turret kit including two or more turret dials that can be easily switched one for the other. The kit can provide different dials with different indicia, sizes, dimensions, contours and the like so that a user can quickly and consistently remove and replace one turret for another, depending on preference or a potential shooting activity. Where the same cap is used for joining the dials to the base, the number of parts in a kit can be reduced. Where the cap and cover can be removed without the use of tools, conversion from one dial to another can be easy and relatively effortless.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
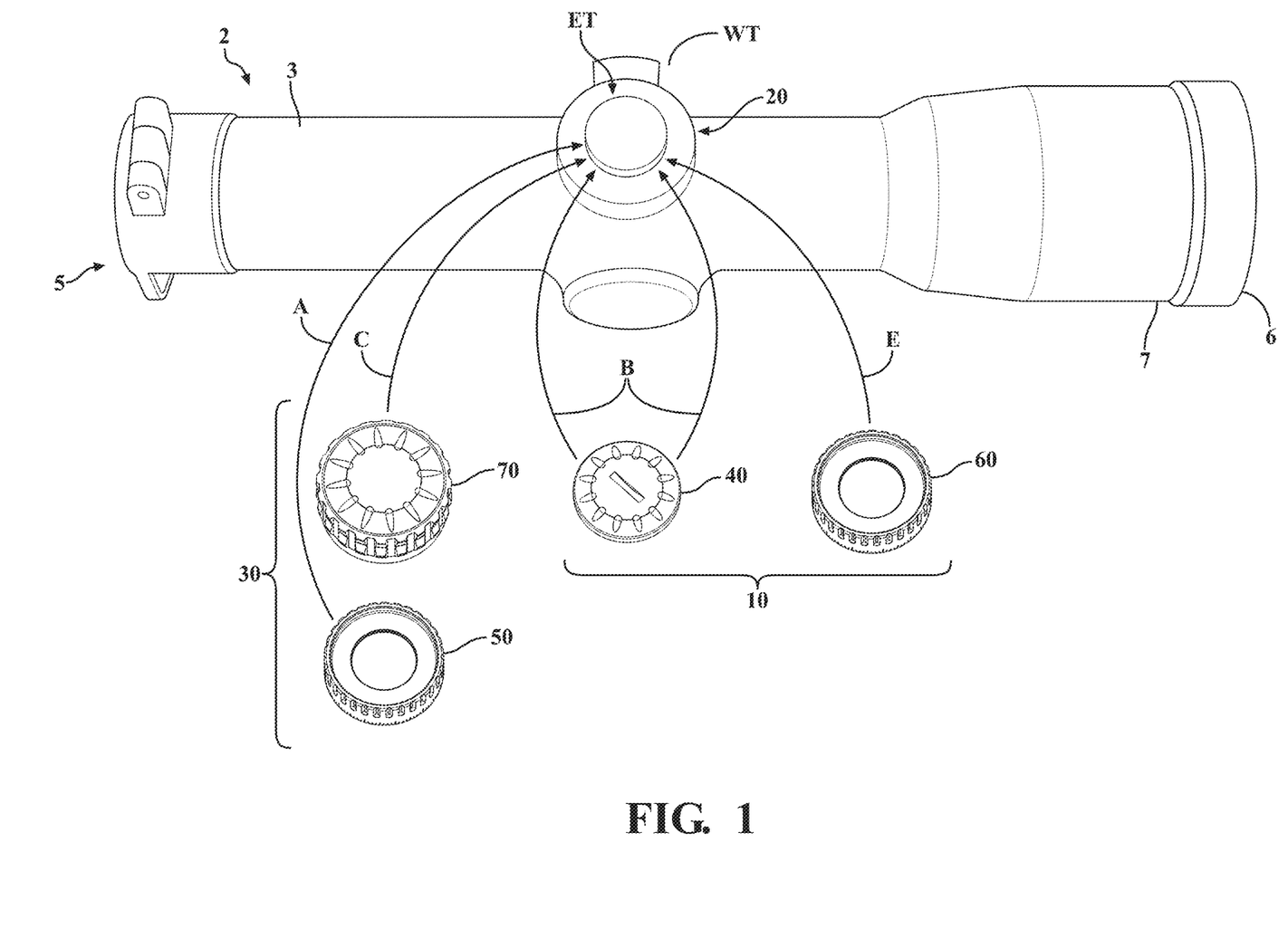
FIG. 1 is a perspective view of an optical scope including a turret kit comprising at two different sets of turrets for installation relative to the optical scope.
Figure 2:
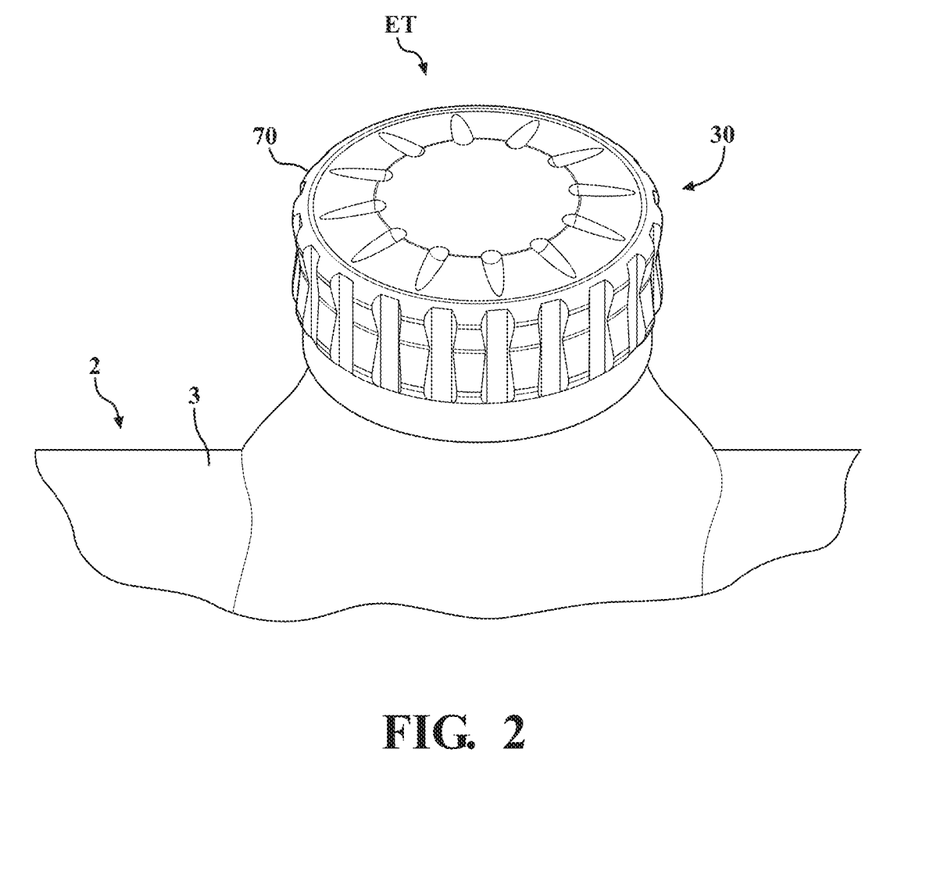
FIG. 2 is a top perspective view of a first turret installed relative to the optical scope.
Figure 3:
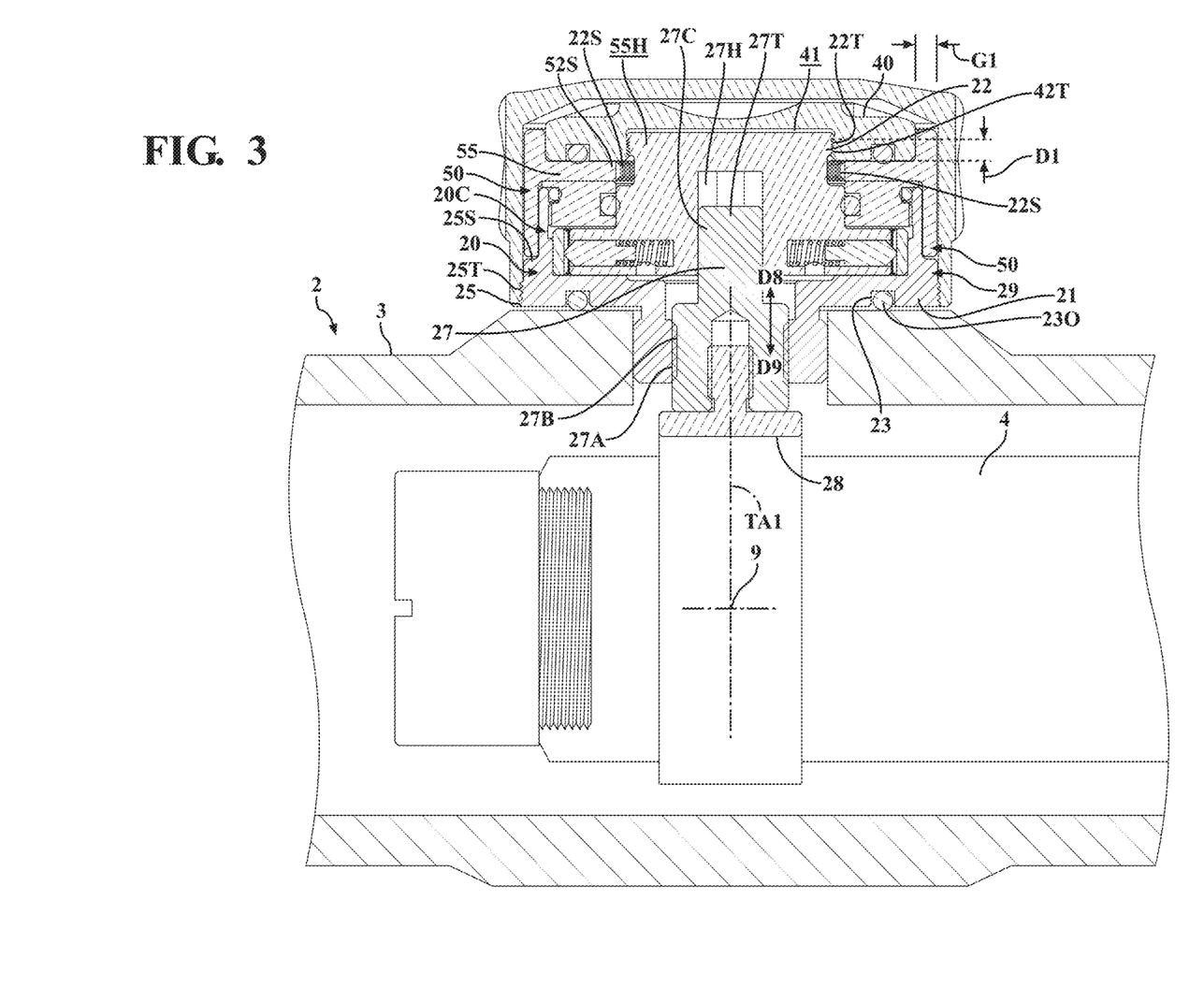
FIG. 3 is a section view of the first turret mounted to the scope.

A current embodiment of a scope including a turret of the current embodiment is shown in FIGS. 1-9, and generally designated 2. As shown in FIG. 1, the scope 2 can be an optical scope including one or more lenses inside a scope body 3. The scope can be referred to as a weapon scope, and can be mountable to a weapon, such as a firearm, for example a rifle, a handgun, a crossbow, or any other projectile firing device. The scope 2 and in particular the scope body 3 can enclose a movable optical element 4 as shown in FIG. 3, which can be an erector tube. The scope body 3 can be an elongated tube with a forward end 5 and a rearward end 6. The rearward end can include an eyepiece 7 that faces a user and the forward end can include an objective lens. The center axis of the movable optical element defines the optical axis OA of the scope 2.

The scope can include an elevation and windage turrets. These turrets can be similar or identical in construction in many ways and can be used to adjust the elevation and windage of the movable optical element to alter a point of impact of a projectile fired from the weapon to which the scope is mounted. The turrets can extend outward from the scope body at 12 o'clock and 3 o'clock and can be arranged so that their respective turret axes are perpendicular to one another. Generally, only an elevation turret ET, its respective components and an interchangeable kit associated with that elevation turret will be described herein, as the windage turret WT and an associated kit can be virtually identical.

In operation, the scope can be adjusted by rotating the turrets one or more clicks to change a point of impact of the projectile fired from the weapon to which the scope is mounted. In particular, the movable optical element 4 can be adjusted by rotating the turrets one or more clicks. A click can be a single tactile and/or audible adjustment increment on the elevation or windage turret of the scope, each of which can correspond to an indicia element as described below. A single click optionally can alter a point of impact by ¼ inch at 100 yards, but a click may take on other values, such as ½ inch, 0.1 milliradian, or other increments depending on the application. In the illustrated embodiment, one click can correspond to an adjustment of the point of impact by ¼ Minute of Angle, or MOA, which is a unit of measurement of a circle, equivalent to 1.0472 inches at 100 yards. Typically, an MOA is equated to 1 inch at 100 yards, 2 inches at 200 yards, 5 inches at 500 yards, ½ inch at 50 yards and so on.

In the current embodiment, the elevation turret ET can be set up to include different components which can be provided in kit form when the scope 2 is sold or provided to a customer or user. For example, a scope can be sold in a container containing a kit including two different turret setups for each of the elevation and windage turrets. As shown in FIG. 1, the scope 2 can be provided with a turret kit including a target turret assembly 10 and a basic turret assembly 30. In FIG. 1, only an elevation turret kit including the assemblies 10 and 30 are illustrated there. Of course, with every scope, target and basic turret assemblies can be provided for both the elevation turret ET and the windage turret WT. The basic turret assembly 30 of the kit can include a dust cover 70 and a first dial 50. The target turret assembly 10 of the kit can include a cap 40 and a second dial 50. The cap 40 of the target turret assembly 10, however, can be used in connection with the turret assembly 30 as well, that is, the same cap 30 from the first assembly 10 can be interchangeably used with the first dial 50 and the second dial 60 to secure those elements to a base 20 of the elevation turret ET and/or to a windage turret WT when using the dials and components with that turret WT associated with the scope 2.

The elevation turret ET can comprise a base 20 which can be a generally cylindrical body with a lower portion 21 that can define a groove 23 to accommodate a seal, such as an o-ring 230 extending around the axis TA1 to prevent liquid, dust and/or debris from entering the turret or the scope body 3. The lower portion 21 of the base can include a lower surface that is fitted against the scope body. The lower portion and base can be fixedly adhered, glued, cemented, welded, fastened, bonded, or otherwise secured to the scope body so that the base remains in a fixed position with respect to the scope body when the elevation turret is rotated. With this fixed connection, the turret base sometimes can be considered functionally unitary or integral with the scope body 3. In some applications, the base and the turret are not removable from the scope body without damaging or functionally altering the turret or scope.

Figure 4:
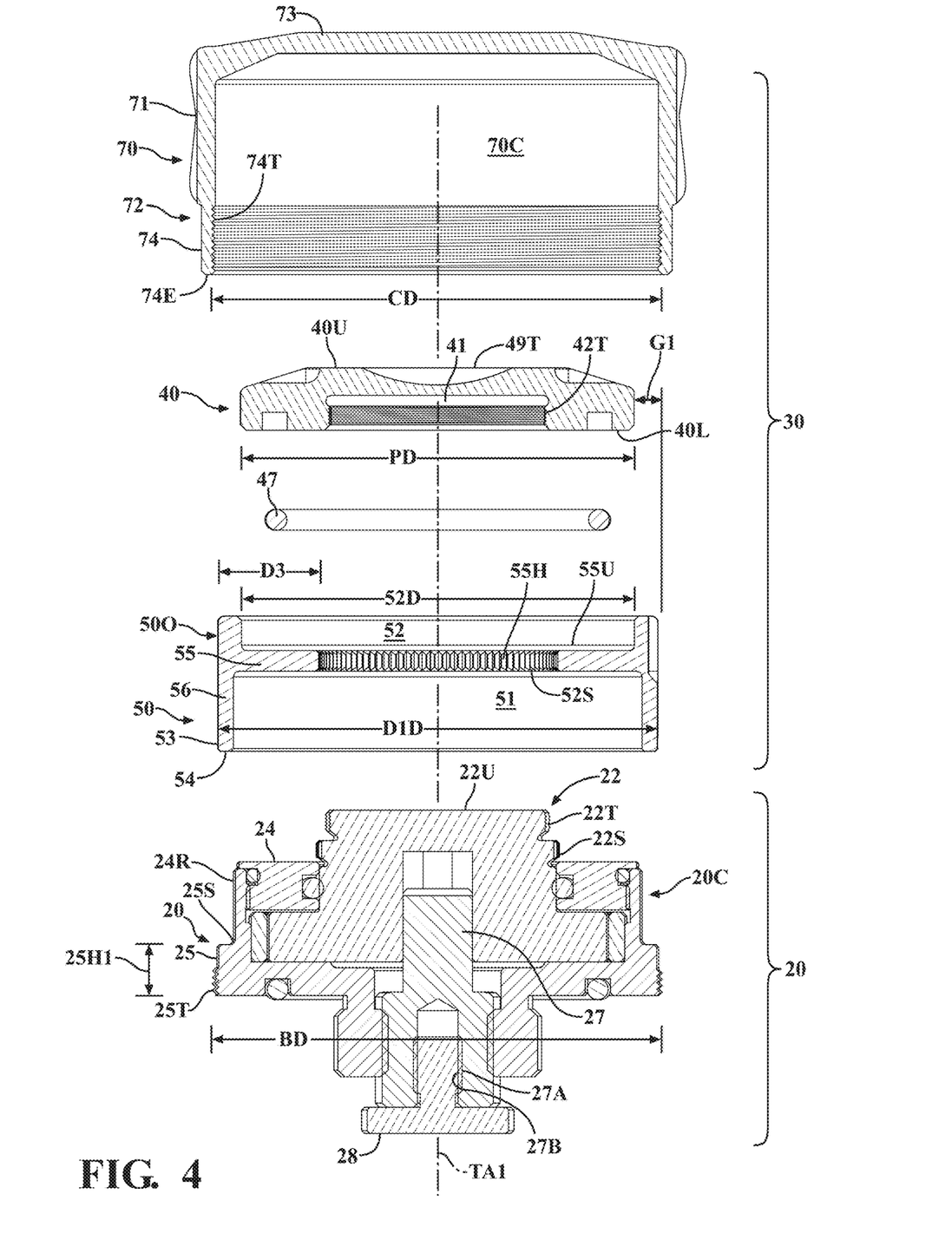
FIG. 4 is an exploded section view of the first turret.

As shown in FIGS. 3 and 4, the base can include a moveable pin 27 that includes a head 28 which can be coupled to or engage the optical body 4. The optical body 4 optionally can include a reticle, a dot, a chevron, an aiming point or some other type of sighting element can be aligned with a target that is sighted through the scope 2. The sighting element may or may not be illuminated for viewing in low light. If it is, a light or other illumination mechanism optionally can be included in the scope. The base 20 can include a threaded portion 27A that receives a corresponding threaded portion 27B of the moveable pin 27. The base 20 can include a collar 20C that can be non-rotationally but axially translatable relative to the moveable pin 27 via a collar attachment 27C. This collar attachment 27C optionally can include a paddle or polygonal or irregular element placed in a similarly shaped aperture or hole 27H into which a corresponding shaped tip or portion 27T of the moveable pin 27 fits and is slidably received so that it can move in directions D8 and D9 when the collar 20C is rotated.

For example, when the collar 20C is rotated, the threaded portion 27A rotates relative to the threaded portion 27B, and as a result, the moveable pin 27 can move in directions D8 and/or D9 axially along the turret axis TA1 depending on clockwise or counterclockwise rotation. As a result, the contact portion or head 28 of the moveable pin 27 can engage the body 4 within the scope 2, subsequently moving a sighting element 9 to alter the point of impact of a projectile shot from the weapon to which the scope 2 is joined. Optionally, the collar attachment 27C and moveable pin 27 can move axially along the turret axis TA1, within the aperture 27H of the collar 20C during the movement in directions D8 and/or D9.

Figure 5:
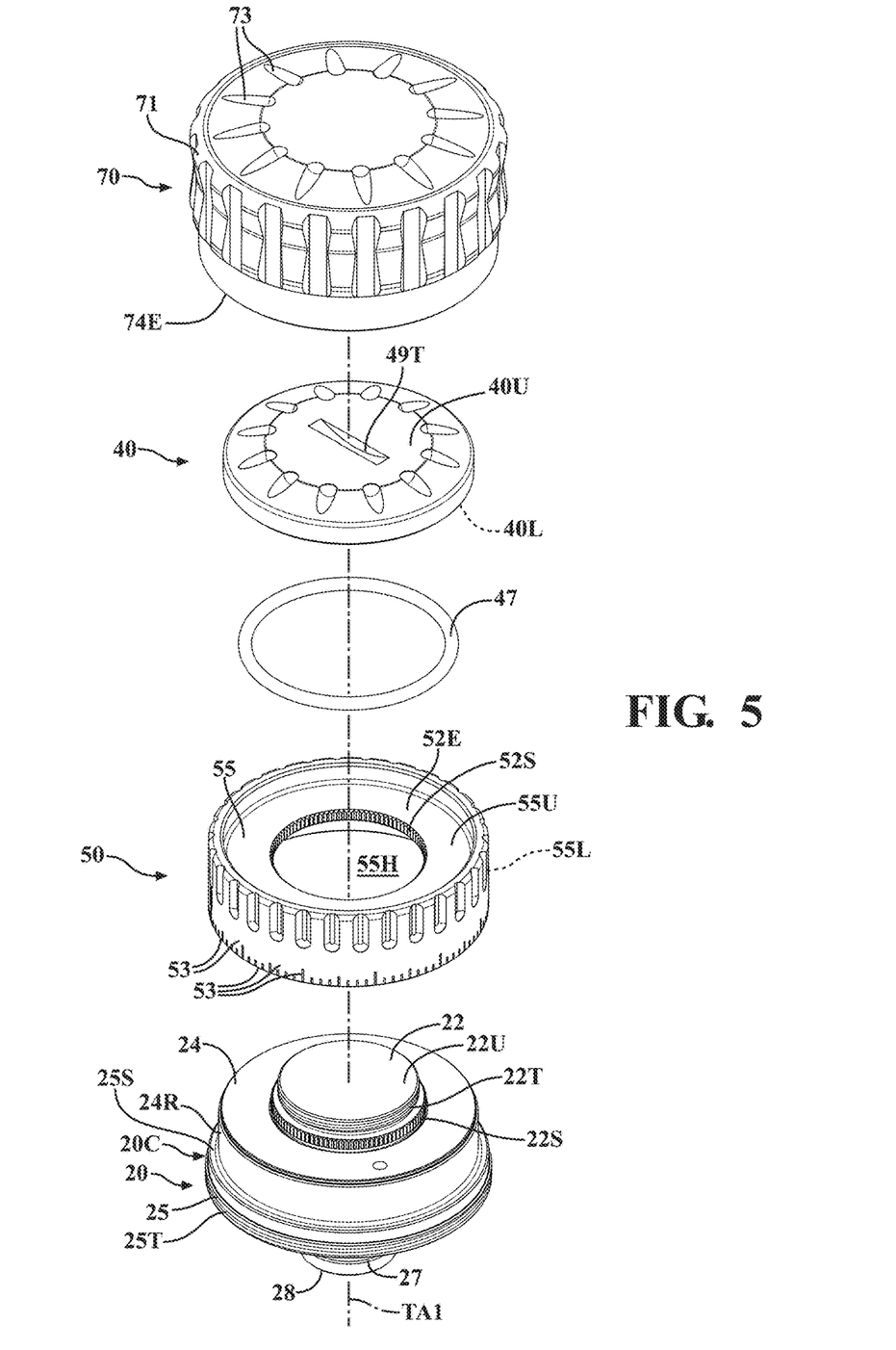
FIG. 5 is an exploded perspective view of the first turret.
Figure 6:
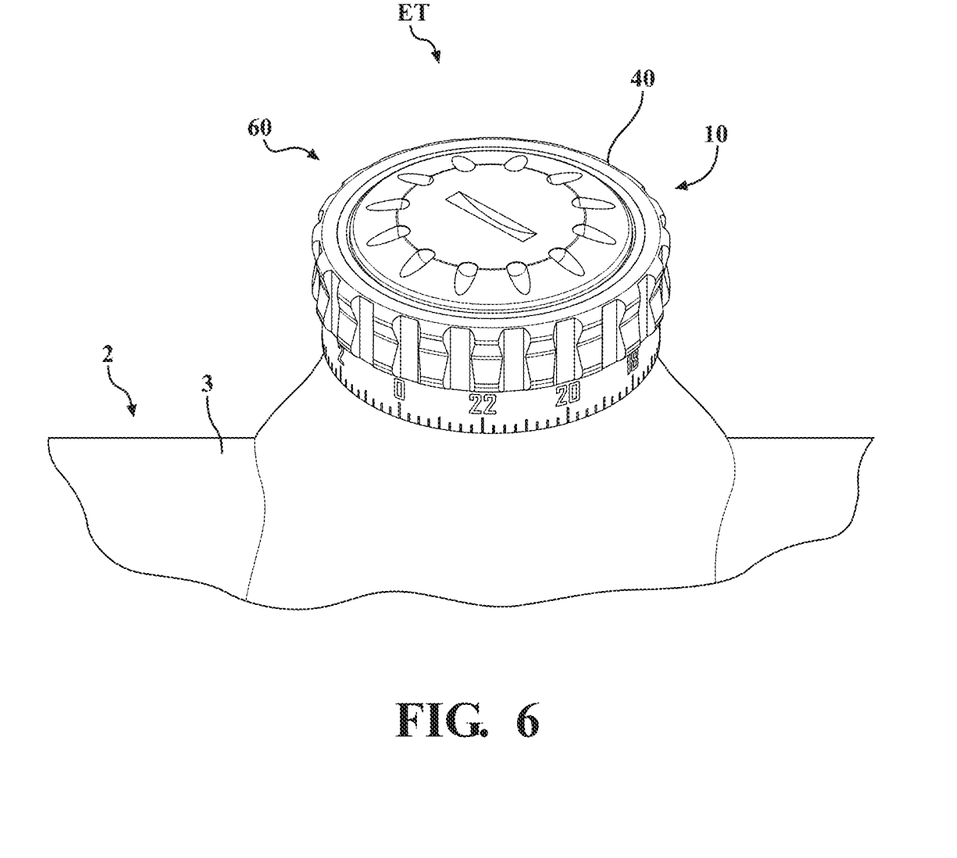
FIG. 6 is a top perspective view of a second turret installed relative to the optical scope.

As shown in FIGS. 3-5, the collar 20C and base 20 in general can include an adjuster shaft 22 having outer shaft threads 22T. The adjuster shaft 22 can be rotatably mounted in the base and coupled to the moveable pin 27, optionally via the connection 27C or some other mechanism. Optionally, the adjuster shaft 22 and pin 27 can rotate in unison when whichever one of the dials 50 or 60 is coupled to the base and rotated by a user manually engaging those dials. The adjuster shaft 22 can extend upward to an upper shaft surface 22U which can be a generally flat and/or planar surface. This surface can be low profile so that it can fit within cap 40 as described below. Below the upper surface 22U, the adjuster shaft 22 can include the threads 22T mentioned above. Those threads can extend downward and can be configured to engage the threads 42T of the cap 40 within the threaded recess 41 of the cap 40.

Below the threaded portion 22T, the adjuster shaft 22 can include a dial engagement element or surface 22S. As shown in FIGS. 4 and 5, that engagement surface 22S can comprise a plurality of splines extending around the turret axis TA1. The splines 22S can be configured to engage a corresponding secondary engagement surface 52S or tertiary engagement surface 62S of either the first dial 50 or the second dial 60 respectively. Each of the respective engagement surfaces can be in the form of corresponding splines that can engage the splines 22S of the base 20.

With further reference to FIGS. 3-5, the base can extend downward below the engagement surface or splines 23S of the adjustment shaft 22. Below those lines 23S, the base can include the collar 20C. The upper portion of the collar 20C or the base adjacent the adjustment shaft 22 can include a rim 24. This rim can extend outward away from the splines and threads of the adjustment shaft 22 to an outer wall 24R. The outer wall 24R can be generally cylindrical and the rim can be of a circular or washer shape around the axis TA1, extending outwardly from the adjustment shaft 22.

As shown in FIGS. 3-5, the base 20 can extend further downward below the wall 24R to a base lower perimeter 25, which can be placed adjacent the scope tube 3 or a housing or bell shaped projection that is associated with the scope tube adjacent the turrets. This lower perimeter 25 can be of a circular or cylindrical shape and can include a base thread 25T, which can comprise a plurality of threads. The base thread 25T can be placed immediately adjacent the scope tube or body 3 and/or the bell projection when the turret is fully assembled relative to the scope 2. Optionally, immediately above the thread 25T the base 20 can include a shelf or shoulder 25S. The shelf 25S can extend between the base lower perimeter 25 and the collar outer wall 24R. The collar outer wall 24R can be cylindrical. The shelf 25S can project outwardly from the wall 24R and can generally be of an annular or ring shape, surrounding the cylindrical wall. The shelf can be disposed above the thread 25T and the lower perimeter 25 on the lowermost portion of the base. The annular or ring shaped shelf 25S can extend outward to the lower perimeter 25, which also can be of a generally cylindrical or round shape extending around the axis TA1, except for a portion of that lower perimeter 25 that includes the thread 25T. Optionally, the lower perimeter 25 is shown to include about half of its height 25H1 occupied by thread 25T, however, more or less of that height can be threaded depending on the application. Further, the thread 25T can extend along any portion of that height rather than simply the lower portion of the height as shown for example in FIG. 4. The base lower perimeter 25T also can define base diameter BD. This base diameter BD can be greater than the hole in the scope tube through which the adjuster shaft 27 is disposed. The threads 25T also can have a similar base diameter BD.

As mentioned above, the elevation kit of the current embodiment can include a target turret assembly 10 and a basic turret assembly 30. The base 20 and its components described above can be compatible with the other components of each of these assemblies. The basic turret assembly 30 will be described in connection with FIGS. 2-5. When assembled and installed relative to the scope 2, the basic turret assembly 30 can include the dust cover 70 which is visible to the user extending upwardly from the scope tube. This dust cover 70 can be securely fastened to the base 20 and cannot be rotated to provide adjustment to the base, the optical tube or the sighting element. The dust cover 70 conceals and covers the cap 40 and the first dial 50, preventing those elements from being engaged manually by a user. Thus being covered, these components, such as the first dial 50 cannot be rotated for adjustment of the sighting elements within the scope 2. This keeps the elements generally fixed and prevents the reticle from being adjusted inadvertently via the dial being bumped or contacted.

The dust cover 70 as illustrated can include an outer engagement surface 71 along an outer wall that can be generally cylindrical and can extend downward from an upper wall 73. The upper wall 73 and/or the outer wall 71 can include ridges, protrusions, recesses, or other features or contours that can be grasped by a user to impart rotation to the dust cover and remove it from the base to access the first dial. The upper wall 73 also can include one or more of the same type of features to facilitate rotation of the dust cover when access to the first dial 50 is desired by a user for adjustment of the optical scope and its sighting element. The dust cover 70 shown in FIGS. 3-4 can include a lower portion 74 and a lowermost edge 74E. Adjacent the lowermost edge 74E thread 74T can be included on the inner surface, facing inward toward the turret axis TA1. The thread 74T can extend around the entire circumference of the perimeter of the dust cover 70. Incidentally, the cover here is referred to as a dust cover even though it may or may not have dust protective capabilities. The dust cover 70 can include a cover diameter CD at the thread 74T and/or generally adjacent to the lower edge 74E of the dust cover 70. This cover diameter CD can be slightly greater than the base diameter BD of the base 20. Accordingly, the thread 74T can threadably engage the thread 25T of the base. The dust cover 70 can be threaded onto the base via interaction of the threads 25T and 74T. The lower edge 74E of the dust cover optionally can bottom out against the scope tube or bell housing adjacent the turret. In other cases, the thread 74T can include a shoulder that can cease rotation and tightening of the cover to the base. Yet further optionally, the upper wall 73 of the cover 70 can engage in upper surface 40U of the cap 40 when tightened to cease tightening of that cover 70 relative to the base 20 tube.

As mentioned above, the dust cover can include a cover diameter CD. This cover diameter can be greater than a first dial outer diameter DID of the first dial 50. This is so the first dial 50 can be covered by and fit within the interior compartment or recess 70C of the dust cover 70. The dust cover 70 thus can be placed over the top of the first dial 50 and conceal that first dial 50 within the dust cover when the first turret assembly 30 of the kit is installed relative to the base and elevation turret ET. With the dust cover concealing and covering the first dial 50, that dial can be protected from unintentional adjustment or movement of the dial and thus the sighting element associated with the turret.

The basic turret assembly 30 also can include a basic dial which again can be the first dial 50 shown in FIGS. 3-5. This versatile 50 can include first reference indicators 53 extending around a circumference or outer surface of the dial. These first reference indicators 53 can be lines, marks, disha, alphanumeric characters, darts or other indicia that can allow a user to appreciate rotation or movement of the dial 50 about the turret axis TA1 when making adjustments to the scope. The first dial 50 can include splines 52S which again can mate with the splines 22S or other engagement surfaces of the base to rotationally lock the two elements together so that they rotate in unison. The first dial 50 can include a first dial lower edge 54, the forms lowermost portion of the dial. The first dial lower edge 54 can be disposed around the perimeter of the outer wall 56 of the first dial 50. The outer wall 56 can include the first reference indicators 53 extending around the circumference of the wall and the first dial 50 in general. Outer wall can be generally cylindrical and can be disposed around the color wall 24R when the first dial 50 is installed relative to the base 20. The first dial lower edge 54 can be configured to be placed above and immediately adjacent to the shelf base shelf 25S of the base 20 when the dial 50 is installed relative to the base 20. The first dial lower edge also can be disposed above the threads 25T along the lower perimeter 25 of the base 20. The first dial diameter also can be less than the base diameter BD of the base. In some cases, diameter DID can be less than or equal to the base diameter BD.

As shown in FIG. 4, the first dial 50 optionally can include the first compartment 51 that is disposed below a flange 55 and can extend inwardly from the outer wall 56 of the first dial 50. The first dial 50 also can include a second compartment 52 that is disposed above the flange 55. The flange 55 can extend inward from the wall 56. The flange optionally can be of a washer shape, a ring shape and/or or an annular shape, extending generally inward toward a first flange inner edge 52E. As noted above, that edge 52E can include one or more splines or other engagement surfaces 52S. The flange 55 can include an upper surface 55U and a lower surface 55L. The flange can also surround a hole or aperture 55H through which the adjustment shaft 22 can at least partially fit. For example, with reference to FIG. 3, the adjustment shaft 27 can extend upward and through the whole 55H hella being at least partially surrounded by the 1st flange 55. The first dial splines 52S on the inside of the flange can interlock with the base splines 22S along the adjustment shaft 22 when that first dial 50 is installed relative to the base 20 so that the first dial and the base can rotate in unison. The threaded portion 22T of the adjustment shaft 22 can extend upward above the first flange first distance D1. That first distance D1 Kim be above the upper surface 55U of the first tile flange 55. The threads can be exposed enough above the 1st flange 55 so that the threads 42T of the cap 40 can engage threads 22T and secure the cap to the first dial in the base. Really threaded part 22T of the adjustment shaft 22 can extend upwardly and be disposed in the recess 41 defined by the CAP 40. The upper wall 40U of the cap also referred to as the cap top, can extend above the first splines of the dial as well as the base splines of the base. The cap top also can extend above the threads 22T and above the upper surface 22U of the adjustment shaft 22 when the cap is installed relative to the first dial and the base.

As mentioned above, the first dial can include 1st compartment 51 below the flange 55 second compartment 52 above the flange 55. Generally, the color 20C and the rim 24 can fit within the 1st compartment 51. The cap 40 can fit within the second compartment above the flange. When the cap is threaded to the adjustment 22 and tightened by a user, through lower surface 40L of the cap can engage the upper surface 55U of the flag. Optionally, where an o-ring for other elastomeric sealing member 47 is included with the cab, that member 47 can engage the upper surface 55 view of the flange and provide a sealing seal around the cool 55H. As the cap 40 is tightened, the threads 42T thread onto the threads 22T of the adjustment shaft 22 and push the flange 55 downward turn into engagement with the rim 24 of the collar 20C, this tightening is continued until the cap is sufficiently installed. When this occurs, the dial 50 camera being interlocked view of the engagement surfaces of the first dial and the color, can rotate in unison. Thus, the base 20 in the adjustment shaft can rotate in unison with the first dial 50. This can allow a user to adjust the internal components of the scope and adjust an associated sighting element inside the scope according to a user's preference. The user optionally can use the reference indicators 53 to note changes in rotation or movement of the first dial 50 relative to the base to keep track of adjustments. The first dial flange 55 optionally can be clamped between the cap 40 and the collar 20C and/or the base 20 can be locked to the dial 50 via interlocking of the surfaces 22S and 52S to ensure that the first dial 50 rotates in unison with the base components and the adjustment shaft 27.

As mentioned above, the cap 40 can include cap thread 42T configured to engage the adjuster shaft thread 22T to secure the cap to the base 20, along with any associated dial, such as the first dial 50 or the second dial 60 as described below. The cap can include the upper surface 40U which is exposed above the dial but can be concealed under the dust cover 70 of the first turret assembly 30. The lower surface 40L can be opposite the upper surface 40U. The upper surface 40U can include one or more projections, ridges or other contours that can be gripped by a user or a simple tool. In some cases, the cap can include a tool slot 49T which can accommodate a coin, screwdriver or other projection to allow the user to rotate the cap 40 relative to the base 20, while holding the first dial or second dial to remove the cap and thus interchange the dials as described below.

The cap also can include a seal 47, which as illustrated can be in the form of an elastomeric seal, such as an o-ring, which can be constructed from rubber, silicone, and/or other components to provide a seal between the cap and the dial and/or its flange. The cap 40 can include an inner cap diameter PD. This cap diameter can be less than or equal to the diameter DID on the first dial 50. The cap diameter PD also can be less than the diameter 52D of the recess or compartment 52 above the flange 55 so that the cap can fit within that compartment 52. When the first dial 50 is installed relative to the base, the cap 40 is placed above the dial, so the seal 47 can be disposed between the cap 40 and the first dial flange 55 to provide a seal there.

Optionally, as described below, the cap and its dimension or diameter PD can be small enough to fit within a corresponding second compartment 62 of the second dial 60 as described below. Further, the same cap 40 can be used both with the first dial 50 and the second dial 60. Accordingly, the seal 47 also can seal between the cap 40 and the second dial 60 and its second dial flange 65 when the second dial is installed relative to the base as described below.

Figure 7:
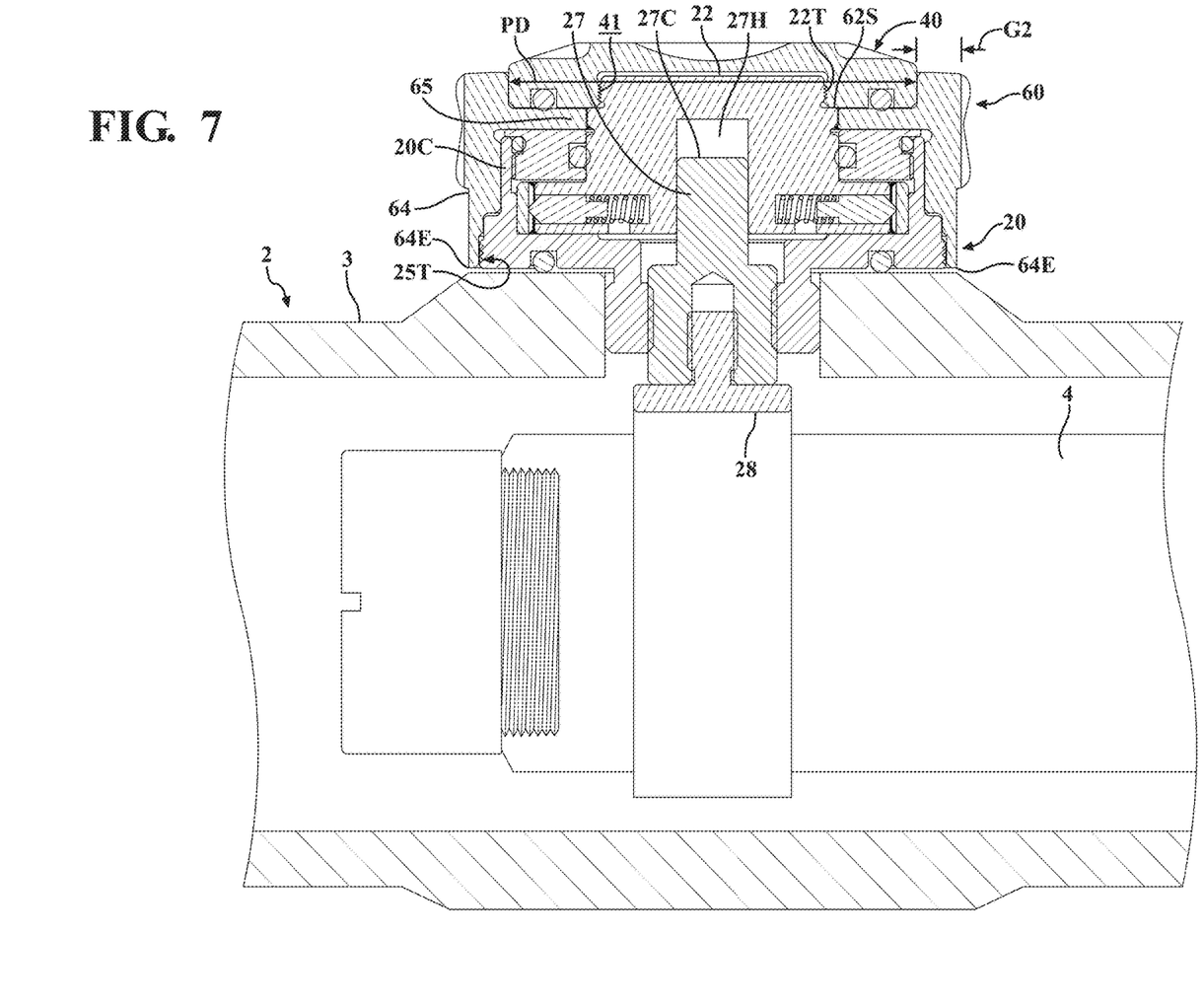
FIG. 7 is a section view of the second turret mounted to the scope.
Figure 8:
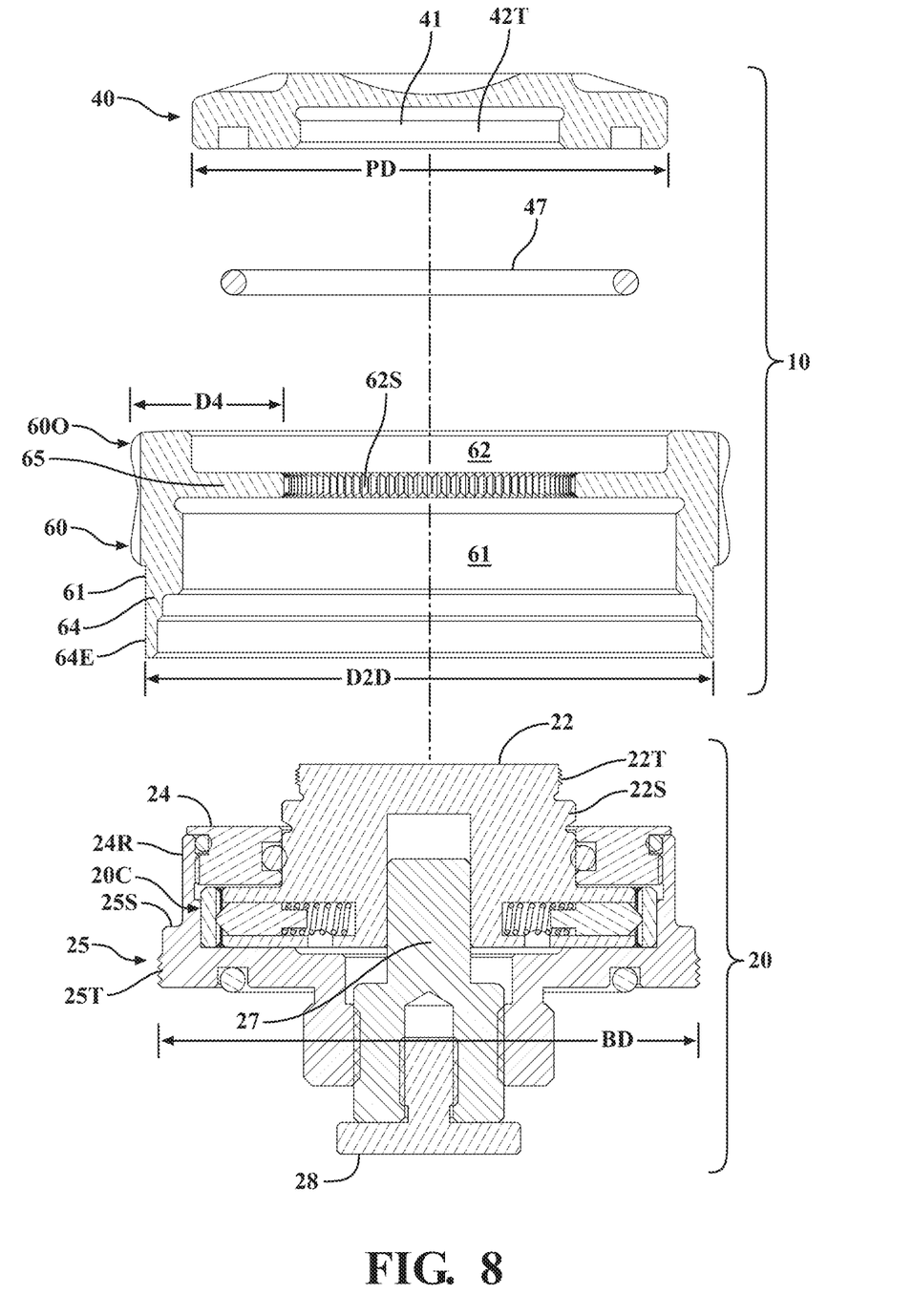
FIG. 8 is an exploded section view of the second turret.

Further optionally, the cap diameter PD can have certain relationships relative to the first dial 50 when installed relative to the base versus the second dial 60 when installed relative to the base. For example, when the first dial 50 is installed relative to the base 50 and the cap 40 is installed to secure the first dial 50 relative to the base, a first gap G1 is defined between the cap outer diameter PD and the first dial outer diameter DID. This gap G1 is illustrated in FIGS. 3 and 4. On the other hand, when the second dial 60 is installed relative to the base 20 and the cap 40 secures the second dial 60 to the base, a second gap G2 is formed between the cap diameter PD and the second dial outer diameter D2D as shown in FIGS. 7 and 8. There, it is apparent that the second gap G2 is greater than the first graph gap G1. This is because the second dial outer diameter D2D is greater than the first dial outer diameter DID.

Yet further optionally, the first outer dial surface 500 can surround the compartment 52 of the dial 50 and the first dial splines 52S and can be radially distal from those splines by a first distance D3 when the first dial 50 is installed relative to the base. A second outer dial surface 600 can surround the compartment 62 of the second dial 60 and the second dial splines 62S and can be radially distal from those splines 52S by a second distance D4 when the second dial 60 is installed relative to the base 20. The second distance D4 can be greater than the first distance D3. Of course, in other applications, the first distance and second distance can be equal to one another or reversed in size.

As mentioned above, the basic turret assembly 30 can differ from the target turret assembly 10 as shown in FIG. 1 by at least the addition of the dust cover 70 as described above. The dust cover 70 can fit over and conceal the first dial 50. The dust cover 70 however cannot fit over and conceal the second dial 60. This is because the second dial 60 can include a second dial outer diameter D2D that is greater than the dust cover diameter CD. The second dial 60 also can include contours, ridges and/or recesses 61 on its outer wall 64 that makes the outermost dimension of the second dial 60 too great to fit within the compartment 70C of the dust cover. Accordingly, the dust cover 70 is used with the first dial 50 cannot be used with the second dial 60 of the target turret assembly 10. However, this is acceptable because the target turret assembly 10 is configured and designed to provide immediate and constant control and adjustment to the sight elements inside the scope 2 for adjusting point of aim and the like.

Figure 9:
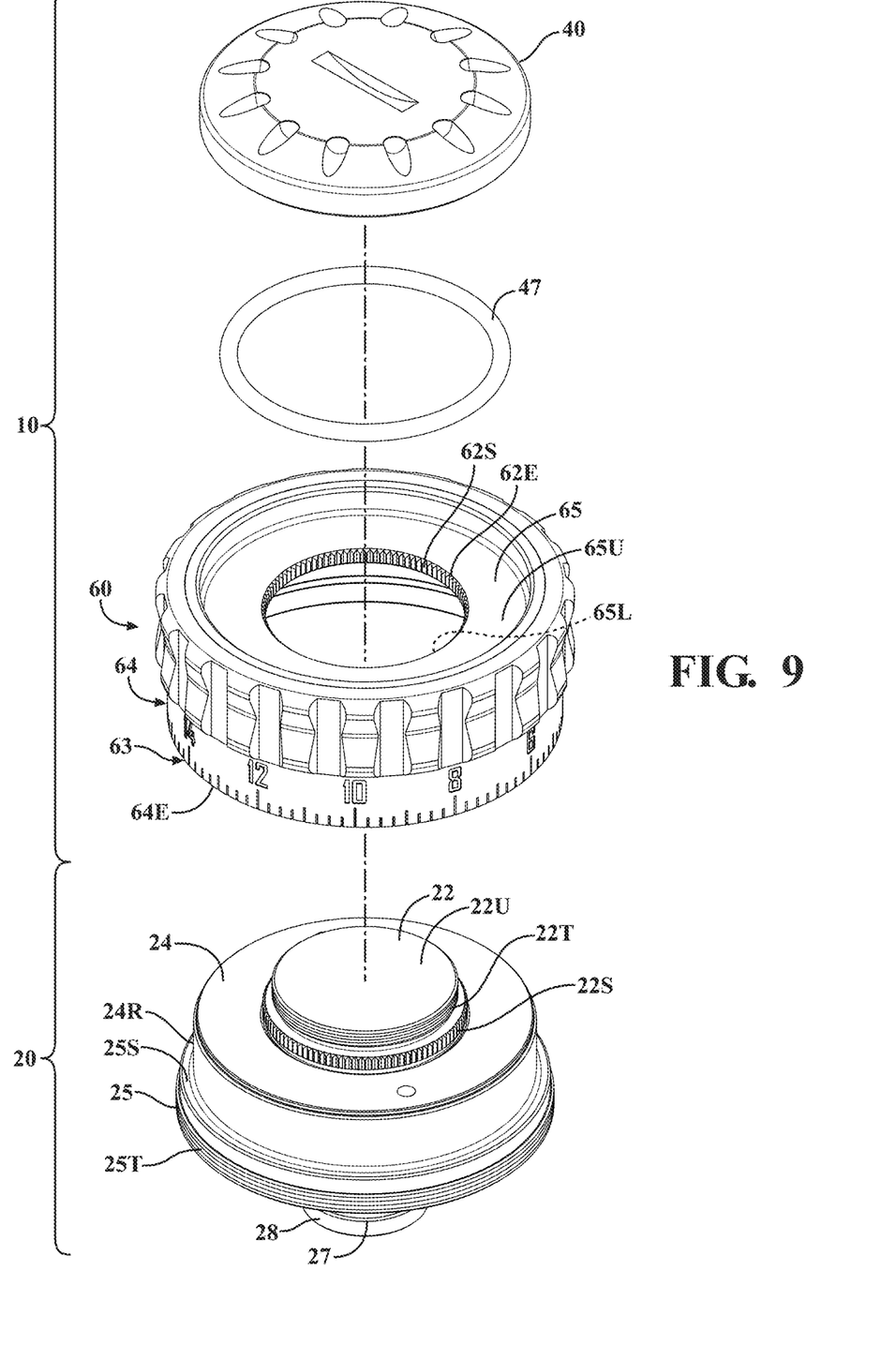
FIG. 9 is an exploded perspective view of the second turret.

Referring to FIGS. 7-9, the target turret assembly also can mount directly to the base 20. This base can include the same components as described in connection with the basic turret assembly 30 above, so those components will not be described again here. The target assembly 10 also can include the same cap 40 having a seal 47 like that described in connection with the assembly 30 above so will not be described again here. This assembly 10 however can include the second dial 60 which as mentioned above can be different than the first dial 50. For example, the second dial 60 can include the second dial diameter D2D which can be greater than the first diameter or dimension DID, and in some cases the same as or greater than the dust cover diameter CD and/or the cap diameter PD. The second dial outer diameter also optionally can be equal to or greater than the base diameter BD.

The second dial can include reference indicators 63 similar to those of the first dial 50 above. In some cases, however the second dial can include more alpha numeric characters and can be more detailed than the reference indicators of the first dial. This is because this dial can be more suitable for precision target shooting in a controlled environment rather than the basic turret assembly. Optionally, the second dial can have a dimension or diameter large enough that the dust cover 70 will not fit over the second dial and cover it.

As shown in FIGS. 7-9, the second dial 60 can include a second dial flange 65. The second dial flange 65 can extend inward to an inward edge 62E. This inward edge can include a second engagement surface 62S, which optionally can be in the form of splines like the splines 52S of the first dial 50 to interfit and interlock with the splines or engagement surface 22S of the base 20. When these splines interlock, the second dial and the base, for example the adjustment shaft 27 of the base, can rotate in unison to provide an adjustment to the internal components and/or sighting element 9 of the scope 2. The second dial 60 can be installed relative to the base 20 such that the flange 65 rests atop the rim 24 and the wall 64 extends downward adjacent the collar wall 24R. The adjustment shaft 22 and the thread 22T thus can extend upward above the upper surface 65U of the flange. The cap 40 can be threaded via the thread 42T to the thread 22T of the base to secure the cap 40 over the second dial 60 and secure the dial to the base in a manner similar to that described above in connection with the first dial.

With this target turret assembly 10 installed, however, again the dust cover 70 cannot be installed over the target turret second dial 60 because of its larger diameter or dimension. The lower edge 64E of the second dial when installed relative to the base can be fastened down with the cap and can extend downward below and beyond the shelf 25S and in some cases below the lower perimeter 25 of the base 20. The lower edge 64E optionally can extend adjacent and/or below the thread 25T on the base lower perimeter 25 when installed. The second dial outer perimeter D2D also can be great enough so that the wall and the lower edge 64E do not contact the thread 25T on the lower perimeter 25 of the base 20. Thus, the lower portion of the wall 64 can rotate freely about that lowermost perimeter of the base freely when the dial is installed relative to the base.

The optical weapon scope turret kit can be offered with any optical weapon scope, such as a rifle scope or other optical sighting device as mentioned herein. In some cases, as shown in FIG. 1, a scope 2 can be provided with two sets of assemblies, for example a basic turret assembly 30 and a target turret assembly 10. For example, one target turret assembly 10 and one basic turret assembly 30 can be included for fitment with an elevation turret ET, and a second target turret assembly 10 and a second basic turret assembly 30 can be included for fitment with a windage turret WT. Based on the user's intended use of the scope, the user can select which assembly for installation relative to the respective windage and elevation bases and install the respective components thereof. For example, if a user wants to use the target assembly 10, then the user will install the second dial 60 in step E on the base 20 in FIG. 1. The user will then install the cap 40 over the second dial 60 in step B to secure the second dial to the base 20 for use. Due to the size and dimension of the second dial, the user will not install the dust cover 70 relative to the scope and/or over the second dial 60. The user thus can adjust the dial 60 at any time after installation of the target turret assembly 10 because the dial 60 remains exposed and accessible. If, however, the user wants to install the basic turret assembly 30, then the user will install the first dial 50 in step A on the base. The user will then install the cap 40 over the first dial 50 in step B to secure the first dial to the base 20 for use. After sighting in or otherwise adjusting or using the first dial 50, the user will install the dust cover 70 over the first dial to conceal it and prevent it from being later unintentionally bumped or moved. The manufacturer of the scope or an aftermarket manufacturer can provide the components of either or both the target turret assembly 10 and/or the basic turret assembly 30 as a kit with the scope or sold as an aftermarket kit for installation relative to a particular scope. The manufacturer can provide instructions regarding the appropriate assembly to use in conjunction with a scope in certain shooting activities. Further, the manufacturer can provide instructions mimicking the steps outlined above to assist a user in assembling either of the respective target or basic turret assemblies as described above.

Optionally, the turret may include a zero stop and related features or other components disclosed in U.S. Pat. No. 12,001,007 to Ding et al, issued Jun. 4, 2024, which is hereby incorporated by reference in its entirety.

Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

Reference throughout this specification to "a current embodiment" or "an embodiment" or "alternative embodiment" means that a particular feature, structure, or characteristic described in connection with the embodiment is included in at least one embodiment herein. Accordingly, the appearance of the phrases "in one embodiment" or "in an embodiment" or "in an alternative embodiment" in various places throughout this specification are not necessarily all referring to the same embodiment. Additionally, the particular features, structures, or characteristics of one embodiment are contemplated for proper and full combination in any suitable manner in one or more other embodiments, which is fully contemplated herein. Further, features, structures, or characteristics of one embodiment or multiple embodiments are readily and completely mixed and matched with any features, structures, or characteristics of any other embodiment or multiple embodiments in varying combinations and permutations.

What is claimed is:

1. An optical weapon scope turret kit comprising:
   a base including an adjuster shaft having an outer shaft thread, the adjuster shaft rotatably mounted in the base, the base including a base thread around a lower perimeter adjacent a scope tube, the lower perimeter defining a base diameter;
   a first dial including a plurality of first elevation reference indicators and a first dial outer diameter that is less than the base diameter;
   a second dial including a plurality of second elevation reference indicators and a second dial outer diameter that is greater than the first dial outer diameter and that is at least as great as the base diameter;
   a cap including a cap thread that threads to the outer shaft thread and is configured to secure the first dial to the base when the first dial is installed relative to the base and to secure the second dial to the base when the second dial is installed relative to the base; and a dust cover placeable over the first dial when the first dial is installed relative to the base but not the second dial when the second dial is installed relative to the base, the dust cover including a dust cover thread configured to engage the base thread and secure the dust cover over the first dial.

2. The optical weapon scope turret kit of claim 1,
wherein the cap includes a cap outer diameter,
wherein a first gap is defined between the cap outer diameter and the first dial outer diameter when the first dial is installed relative to the base,
wherein a second gap is defined between the cap outer diameter and the second dial outer diameter when the second dial is installed relative to the base,
wherein the second gap is greater than the first gap.

3. The optical weapon scope turret kit of claim 1,
wherein the base includes a plurality of base splines adjacent the outer shaft thread,
wherein the first dial comprises a first dial flange including a plurality of first dial splines that interlock with the plurality of base splines when the first dial is installed relative to the base so that the first dial and the base can rotate in unison,
wherein the cap includes a cap top that extends above the plurality of first dial splines and the plurality of base splines when the cap is installed over the first dial.

4. The optical weapon scope turret kit of claim 3,
wherein the second dial comprises a second dial flange including a plurality of second dial splines that interlock with the plurality of base splines when the second dial is installed relative to the base so that the second dial and the base can rotate in unison.

5. The optical weapon scope turret kit of claim 4,
wherein the first dial includes a first dial outer surface that surrounds the plurality of first dial splines and is radially distal from the plurality of first dial splines by a first distance when the first dial is installed relative to the base,
wherein the second dial includes a second dial outer surface that surrounds the plurality of second dial splines and is radially distal from the plurality of second dial splines by a second distance when the second dial is installed relative to the base,
wherein the second distance is greater than the first distance.

6. The optical weapon scope turret kit of claim 1,
wherein the adjuster shaft projects through a first shaft hole defined by the first dial when the first dial is installed relative to the base, such that the outer shaft thread is disposed above a first flange of the first dial,
wherein the adjuster shaft projects through a second shaft hole defined by the second dial when the second dial is installed relative to the base, such that the outer shaft thread is disposed above a second flange of the second dial.

7. The optical weapon scope turret kit of claim 1,
wherein the base includes a base shelf above the base thread,
wherein the first dial includes a first dial lower edge,
wherein the first dial lower edge is disposed above the base thread when the first dial is installed relative to the base.

8. The optical weapon scope turret kit of claim 7,
wherein the second dial includes a second dial lower edge,
wherein the second dial lower edge is disposed below or adjacent the base thread when the second dial is installed relative to the base.

9. The optical weapon scope turret kit of claim 1,
wherein the cap includes a cap lower surface,
wherein an elastomeric seal is disposed adjacent the cap lower surface,
wherein the elastomeric seal seals against the first dial when the first dial is installed relative to the base and seals against the second dial when the second dial is installed relative to the base.

10. The optical weapon scope turret kit of claim 9,
wherein the first dial includes a first dial flange that bounds a first shaft hole configured to receive the adjuster shaft when the first dial is installed relative to the base,
wherein the elastomeric seal is disposed between the cap and the first dial flange when the first dial is installed relative to the base.

11. An optical weapon scope turret kit comprising:
a base including a lower perimeter defining a base diameter;
a first elevation dial including a first dial outer diameter that is less than the base diameter;
a second elevation dial including a second dial outer diameter that is greater than the first dial outer diameter and greater than the base diameter;
a cap configured to secure the first dial to the base when the first dial is installed relative to the base and to secure the second dial to the base when the second dial is installed relative to the base; and
a dust cover placeable over the first dial when the first dial is installed relative to the base but not the second dial when the second dial is installed relative to the base.

12. The optical weapon scope turret kit of claim 11,
wherein the base is configured to sealingly engage a scope tube,
wherein the base includes an outer shaft thread and a base thread, the base thread closer to the scope tube than the outer shaft thread,
wherein the dust cover includes a dust cover thread configured to engage the base thread and secure the dust cover over the first dial to thereby conceal the first dial.

13. The optical weapon scope turret kit of claim 12,
wherein the base includes a base shelf above the base thread,
wherein the first dial includes a first dial lower edge,
wherein the first dial lower edge is disposed above the base thread when the first dial is installed relative to the base.

14. The optical weapon scope turret kit of claim 13,
wherein the second dial includes a second dial lower edge,
wherein the second dial lower edge is disposed at least one of below and adjacent the base thread when the second dial is installed relative to the base.

15. The optical weapon scope turret kit of claim 13,
wherein the dust cover thread engages the base thread below the first dial lower edge when the first dial is installed relative to the base.

16. The optical weapon scope turret kit of claim 15,
wherein the base includes a base outer shaft,
wherein the first dial includes a first dial flange that bounds a first shaft hole configured to receive the base outer shaft when the first dial is installed relative to the base,
wherein the second dial includes a second dial flange that bounds a second shaft hole configured to receive the base outer shaft when the second dial is installed relative to the base, wherein an annular seal is disposed between the cap and the first dial flange when the first dial is installed relative to the base, wherein the annular seal is disposed between the cap and the second dial flange when the second dial is installed relative to the base.

17. The optical weapon scope turret kit of claim 11, wherein the first dial and the second dial are incapable of being installed simultaneously on the base.

18. The optical weapon scope turret kit of claim 11, wherein the first dial includes a first cylindrical interior surface, wherein the second dial includes a second cylindrical interior surface, wherein the base includes a base shelf adjacent a base thread, wherein the first cylindrical interior surface extends upward between a longitudinal axis and the base thread when the first dial is installed relative to the base, wherein the second cylindrical interior surface extends upward outwardly beyond the base thread when the second dial is installed relative to the base.

19. A method of using an optical weapon scope turret kit, the method comprising:

providing a scope tube including a base with an adjuster shaft having an outer shaft thread projecting therefrom, the adjuster shaft rotatably mounted in the base, the base having a base thread around a lower perimeter adjacent the scope tube, the lower perimeter defining a base diameter;

providing a first dial having elevation reference indicators and a first dial outer diameter that is less than the base diameter;

providing a second dial having elevation reference indicators and a second dial outer diameter that is greater than the first dial outer diameter and greater than the base diameter;

providing a cap configured to secure the first dial to the base when the first dial is installed relative to the base and to secure the second dial to the base when the second dial is installed relative to the base; and providing a dust cover over the first dial when the first dial is installed relative to the base but not the second dial when the second dial is installed relative to the base, the dust cover including a dust cover thread configured to engage the base thread and secure the dust cover over the first dial.

20. The of method of claim 19, further comprising:

instructing a user to install the second dial without the dust cover relative to the base.

\* \* \* \* \*